R. CHALFANT.
Corn Sheller.
No. 4,979. Patented Feb. 27, 1847.
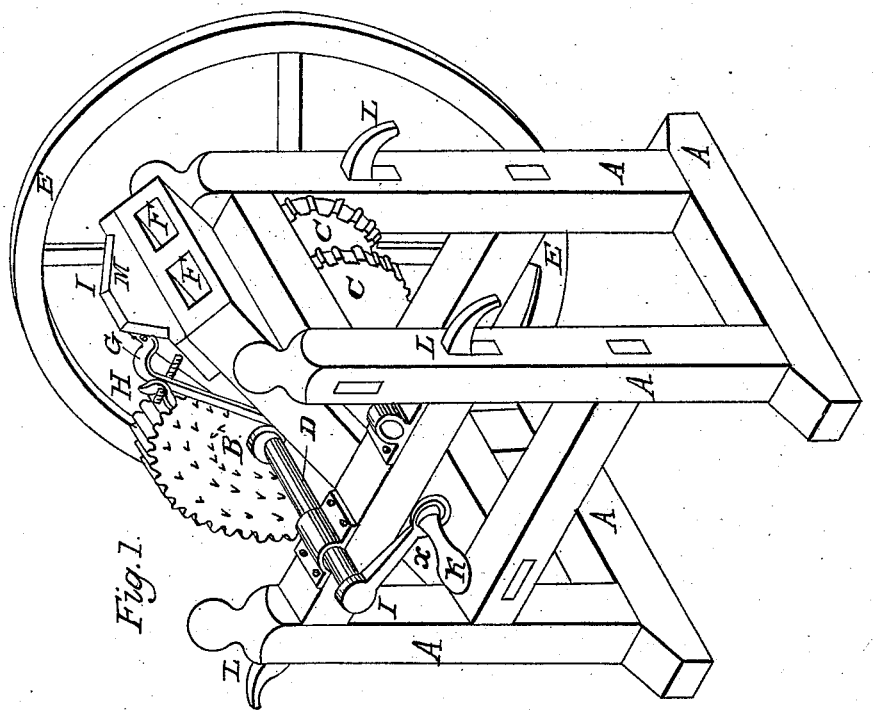
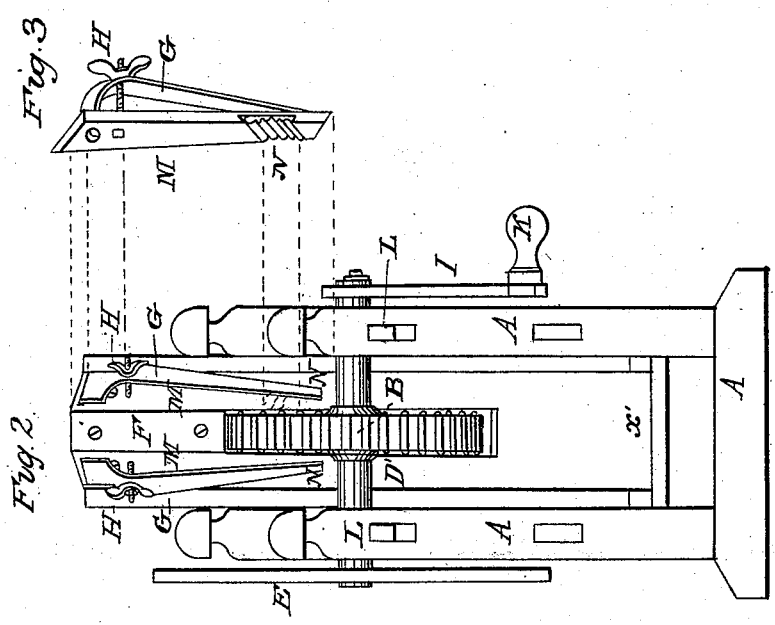

UNITED STATES PATENT OFFICE.

REUBEN CHALFANT, OF WESTGROVE, PENNSYLVANIA.

CORN-SHELLER.

Specification of Letters Patent No. 4,979, dated February 27, 1847; Antedated August 27, 1846.

*To all whom it may concern:*

Be it known that I, REUBEN CHALFANT, of Westgrove, in the county of Chester and State of Pennsylvania, have invented a new and useful Improvement on Corn-Shellers; and I do hereby declare that the following is a full and exact description.

The nature of my invention consists in the combination of springs, and the division board between said springs to prevent the excessive vibration of the stopholder or corn reserver, to strike and to be thrown against the pin wheel and bevel wheel, to save the same from being injured.

To enable others skilled in the art to make and to use my invention, I will proceed to describe its construction and operation reference being had to the annexed drawings making a part of this specification, in which—

Figure 1, (A) is the framework of the cornsheller, in perspective. (B) the pin-wheel; (C) the bevel-wheels; (D) the axle; (E) the fly wheel; (F, F,) the feeding box; (G) the springs; (H) the setscrews; (I) the crank; (K) the crank handle; (L, L, L, L,) the frame handle. Fig. 2, being the same parts and letters as in Fig. 1, in a front view. Fig. 3, representing the spring and stop or cornreserver. (M) the wooden spring and united with the iron corn retainer. (N) the corn retainer, and (G) the steel spring. (H) the setscrew. Fig. 3 (I) the division board which prevents the springs to interfere with the pin wheel and bevel wheel.

The operation is as follows: The machine being put in motion, the corn and cob being thrown into the feeding box (F F) will descend, and enter the small space between the pin wheel (B) (not shown in the drawing)—the bevel wheel (C) and the corn retainer (N). The corn cob in being retained at the point of the corn reserver (N), is exposed to the friction of the projection of the pin-wheel (B), and the rubber of the bevel wheel (C), by which, the grain being detached from the cob, the grain falling through, and the cob rolling down the apron (X). By said operation, the cob in leaving the stop,—producing a vibration on the stopholder (H),—which, in rebounding against the pin-wheel (B), is brought in contact for a moment with the same, and by the passing pins, torn to pieces, or injured, and makes the whole machine useless,—this defect is corrected successfully by my invention. The combination of the springs (G and M) the corn retainer (N) and the division board or stop (I) regulated and set by the setscrews (H) so that the vibration of said springs and corn retainer is limited accordingly in striking against the division board or stop (I)—by such an arrangement the said corn-sheller being one of the most useful and complete machines for said purpose now in the country.

What I claim as my invention and desire to secure by Letters Patent, is—

The combination of the springs G and M, with the division board or stop placed between them substantially in the manner described.

REUBEN CHALFANT.

Witnesses:
PETER VON SCHMIDT,
AUGUST A. VON SCHMIDT.